(12) United States Patent
Kahn

(10) Patent No.: US 9,219,952 B2
(45) Date of Patent: Dec. 22, 2015

(54) VOIDING CALLS TO SIGNAL SUPPLEMENTARY SERVICES

(75) Inventor: Ari Kahn, Johannesburg (ZA)

(73) Assignee: STARSCRIBER CORPORATION, Scottsdale, AZ (US)

( * ) Notice: Subject to any disclaimer, the term of this patent is extended or adjusted under 35 U.S.C. 154(b) by 1583 days.

(21) Appl. No.: 12/303,339

(22) PCT Filed: Jun. 7, 2007

(86) PCT No.: PCT/IB2007/052163
§ 371 (c)(1), (2), (4) Date: Feb. 10, 2009

(87) PCT Pub. No.: WO2007/141762
PCT Pub. Date: Dec. 13, 2007

(65) Prior Publication Data
US 2009/0225972 A1    Sep. 10, 2009

Related U.S. Application Data

(60) Provisional application No. 60/812,341, filed on Jun. 9, 2006.

(51) Int. Cl.
*H04M 1/00* (2006.01)
*H04M 3/42* (2006.01)
(Continued)

(52) U.S. Cl.
CPC ............ *H04Q 3/32* (2013.01); *H04M 3/42059* (2013.01); *H04M 3/42365* (2013.01);
(Continued)

(58) Field of Classification Search
CPC ........... H04W 4/12; H04W 4/16; H04W 4/14; H04W 8/18; H04W 76/02; H04W 76/04; H04M 3/02; H04M 2207/12; H04M 3/42; H04M 3/42059; H04M 1/57; H04M 1/2478; H04M 3/53366; H04M 2203/353; H04M 2203/2011; H04M 3/42042; H04M 3/42374

USPC ............ 455/436, 440, 445, 466, 556; 705/29; 379/88.23, 211.02; 370/352, 353, 354, 370/355, 356, 357, 252, 401
See application file for complete search history.

(56) References Cited

U.S. PATENT DOCUMENTS 7,298,831 B1 *  11/2007  Keohane et al. ............ 379/88.23
7,764,955 B1 *   7/2010  Mangal et al. ................ 455/417

(Continued)

FOREIGN PATENT DOCUMENTS

JP    2006-074304       3/2006
WO   2004/100521 A1   11/2004

OTHER PUBLICATIONS

Harry Newton, Newton's Telecom Dictionary, Mar. 2004, CMP Books, 20th Edition, pp. 146, 170, 613, 844 and 897.*
(Continued)

*Primary Examiner* — Quynh Nguyen
*Assistant Examiner* — Kharye Pope
(74) *Attorney, Agent, or Firm* — Baker Hostetler LLP

(57) ABSTRACT

The invention provides a method and system for signaling asynchronous supplementary services in a telephony network. The method comprises initiating a call between a sender and a recipient on a telephony network including generating a telephony request and disconnecting the call prior to completion of a connection. Concomitantly, an asynchronous communication is initiated between the sender and the recipient using information in the telephony request. The call may be disconnected prior to allocation of a traffic channel or prior to generating a ring at a device of the recipient. In one embodiment the call is disconnected after receipt of the telephony request by an originating mobile switching center but before continuing set-up of the call. Calls aborted in this way can be used to initiate messaging or other services without utilizing voice circuits in a network.

22 Claims, 4 Drawing Sheets

(51) Int. Cl.
*H04Q 3/32* (2006.01)
*H04M 1/64* (2006.01)

(52) U.S. Cl.
CPC ............... *H04M2203/1008* (2013.01); *H04Q 2213/13098* (2013.01); *H04Q 2213/13178* (2013.01); *H04Q 2213/13396* (2013.01)

(56) References Cited

U.S. PATENT DOCUMENTS

| | | | |
|---|---|---|---|
| 8,090,401 B2 * | 1/2012 | Soto | 455/553.1 |
| 2003/0036394 A1 * | 2/2003 | Henry-Labordere | 455/466 |
| 2003/0084106 A1 * | 5/2003 | Erev et al. | 709/206 |
| 2003/0142652 A1 * | 7/2003 | Ting et al. | 370/338 |
| 2003/0199274 A1 * | 10/2003 | Lim | 455/445 |
| 2003/0213753 A1 * | 11/2003 | Landis et al. | 210/723 |
| 2004/0019539 A1 * | 1/2004 | Raman et al. | 705/29 |
| 2004/0077349 A1 * | 4/2004 | Barak et al. | 455/436 |
| 2004/0120494 A1 * | 6/2004 | Jiang et al. | 379/210.01 |
| 2004/0218609 A1 * | 11/2004 | Foster et al. | 370/401 |
| 2004/0224710 A1 * | 11/2004 | Koskelainen et al. | 455/518 |
| 2005/0094796 A1 * | 5/2005 | Beauford | 379/211.01 |
| 2005/0100150 A1 | 5/2005 | Dhara et al. | |
| 2005/0105706 A1 * | 5/2005 | Kokkinen | 379/201.01 |
| 2005/0117726 A1 * | 6/2005 | DeMent et al. | 379/142.01 |
| 2005/0251848 A1 | 11/2005 | Al-Janabi | |
| 2006/0025141 A1 * | 2/2006 | Marsh et al. | 455/445 |
| 2006/0165050 A1 * | 7/2006 | Erhart et al. | 370/351 |
| 2007/0197260 A1 * | 8/2007 | Randall et al. | 455/557 |
| 2007/0211872 A1 * | 9/2007 | Cai et al. | 379/142.01 |
| 2007/0218877 A1 * | 9/2007 | Mills | 455/414.1 |

OTHER PUBLICATIONS

International Search Report for PCT/IB2007/052163 Dated Nov. 16, 2007.

* cited by examiner

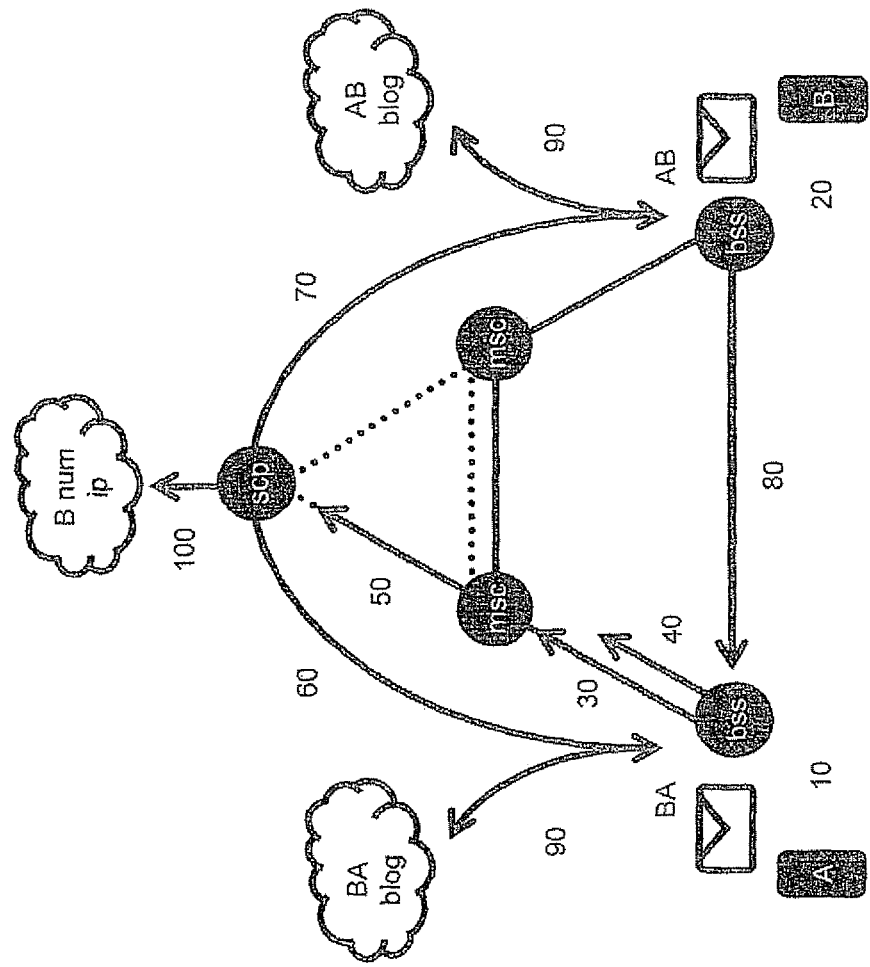
Fig. 1: void entity relationships

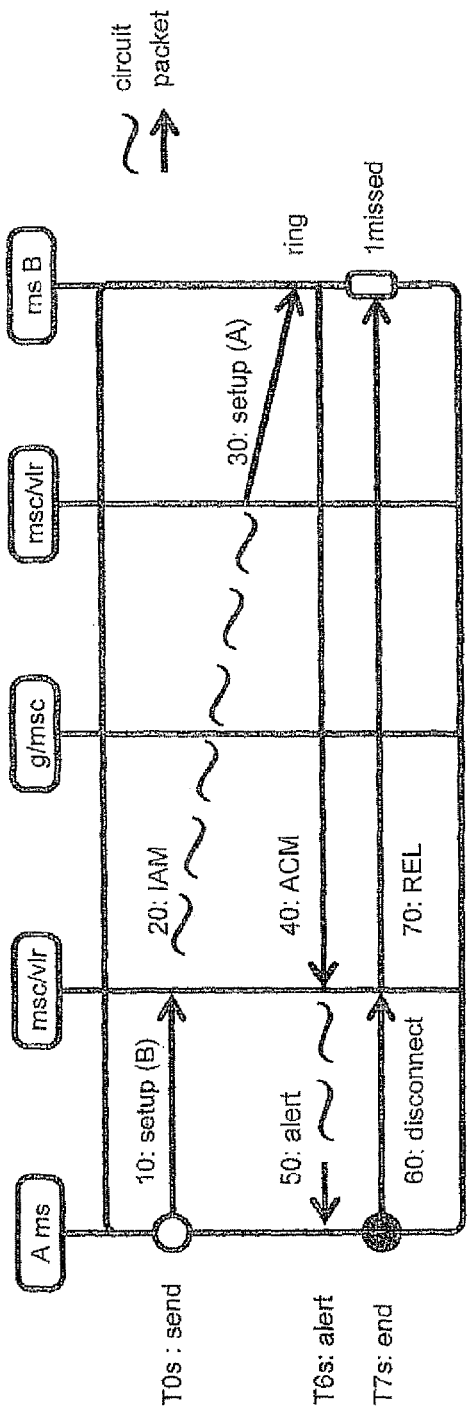
Fig. 2: PRIOR ART (beep)
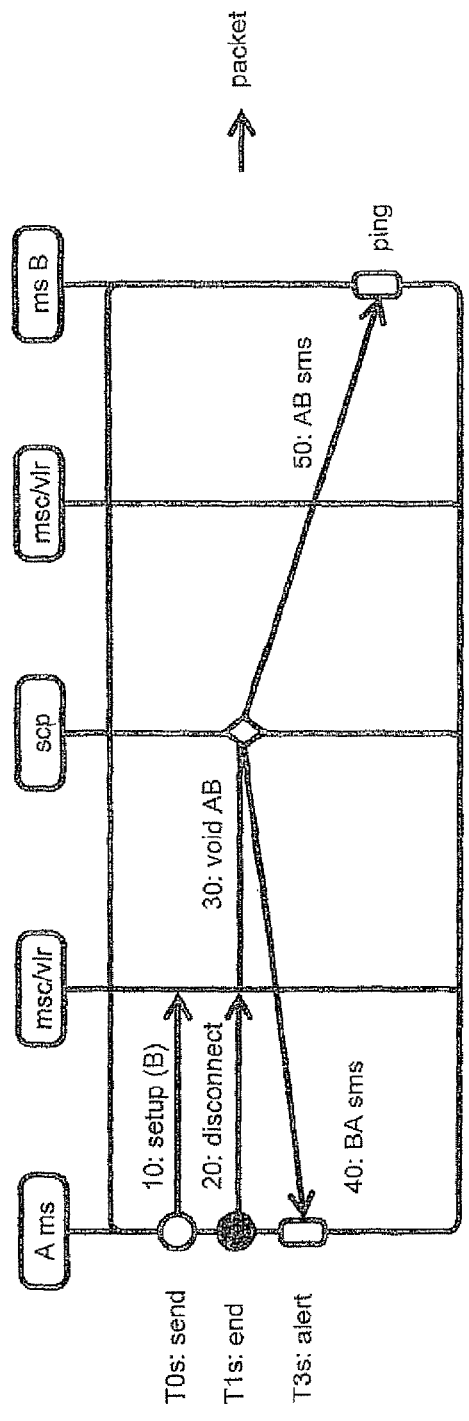
Fig. 3: method disclosed (ping)

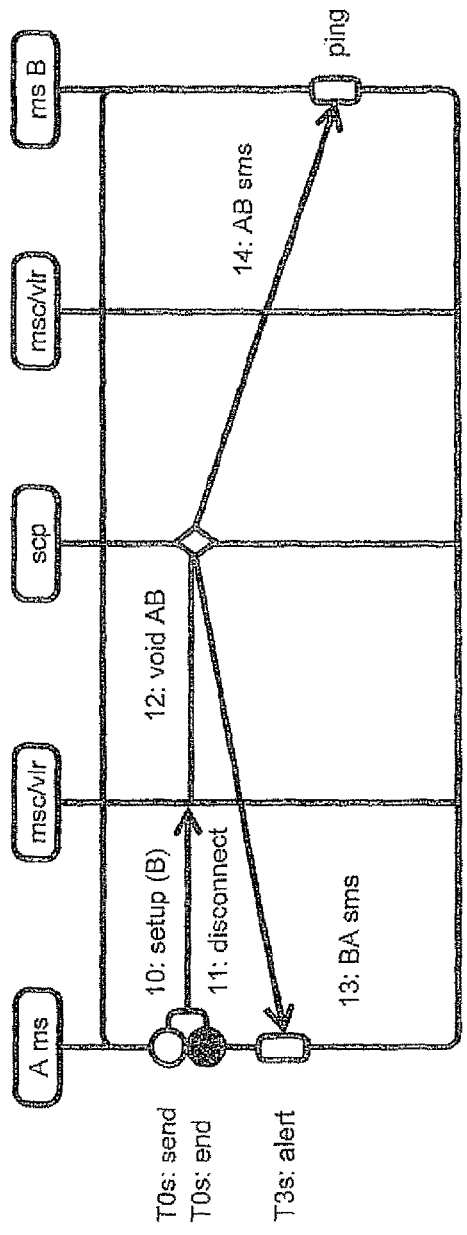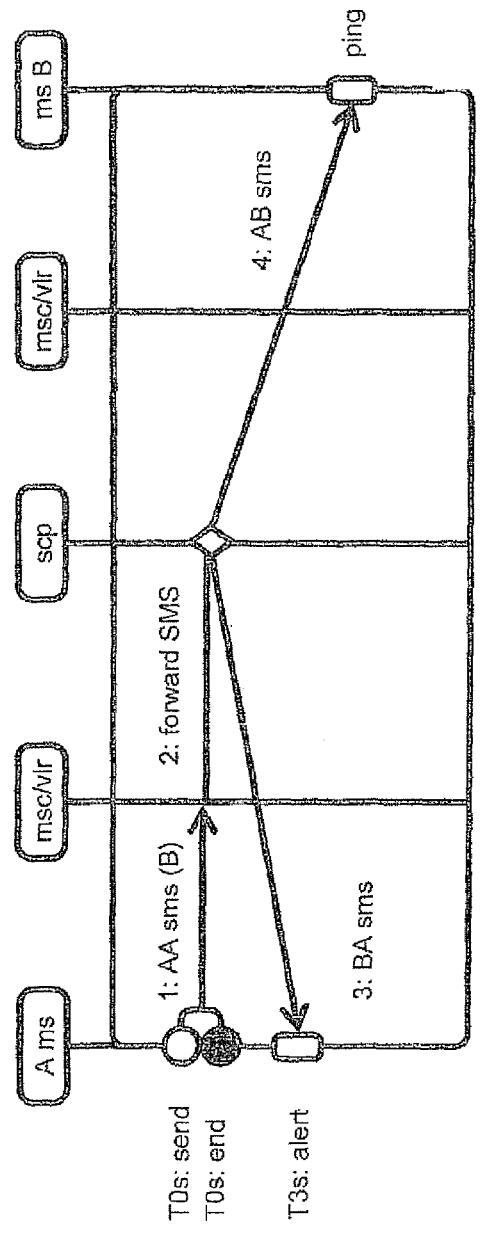

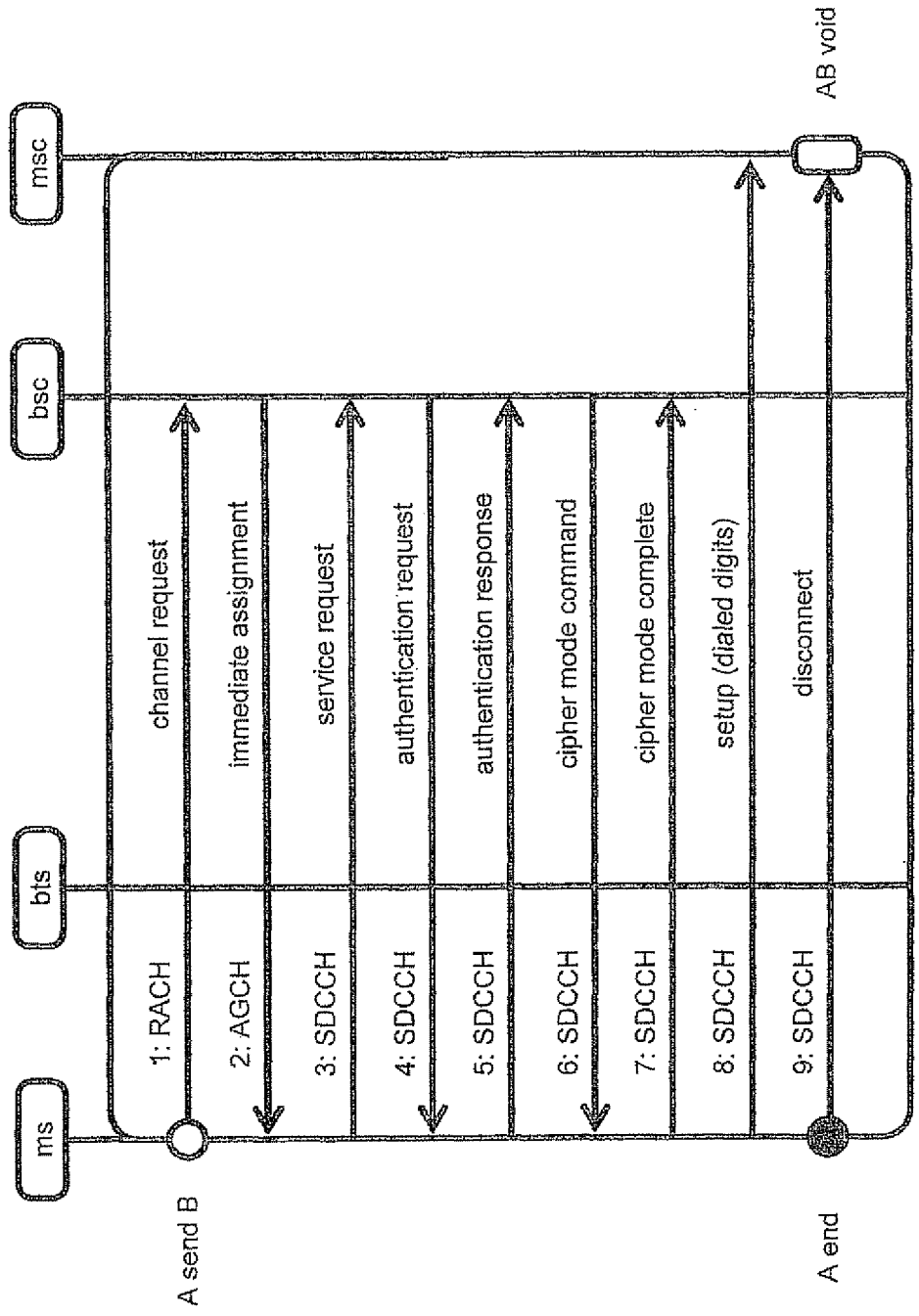

VOIDING CALLS TO SIGNAL SUPPLEMENTARY SERVICES

CROSS REFERENCE TO RELATED APPLICATIONS

This application claims priority to International Application No. PCT/IB2007/052163, filed Jun. 7, 2007, which claims priority to U.S. Provisional Patent Application No. 60/812,341, filed Jun. 9, 2006, both of which are herein incorporated by reference in their entirety.

BACKGROUND OF THE INVENTION

THIS invention relates to a method and system for signaling asynchronous supplementary services in a telephony network.

SUMMARY OF THE INVENTION

According to the invention there is provided a method comprising:
  initiating a call between a sender and a recipient on a telephony network including generating a telephony request;
  disconnecting the call prior to completion of a connection; and
  concomitantly initiating an asynchronous communication between the sender and the recipient using information in the telephony request.

The information in the telephony request may include the sender's telephone number, the recipient's telephone number, and/or other information.

The call may be disconnected prior to allocation of a traffic channel.

The call may be disconnected prior to generating a ring at a device of the recipient.

The call may be disconnected after receipt of the telephony request by an originating mobile switching center but before continuing set-up of the call.

The call may be disconnected after receipt of the telephony request by an originating mobile switching center, the method including disconnecting the call provisioning such that an associated connect request is not transferred between the originating mobile switching center and a serving mobile switching center.

The call may be disconnected prior to generation of a ring-back tone at a device of the sender.

The method call may be disconnected before announcing that the recipient is unavailable.

The call may be disconnected before rerouting to voicemail.

The call may be disconnected before announcing connection errors.

The call may be disconnected during call origination.

The call may be disconnected due to network congestion.

The call may be disconnected by the telephony network.

The step of initiating an asynchronous communication may include sending a message to a device of the recipient.

The method may further comprising sending a message to a device of the sender.

Such a message may include a request to initiate a call to the sender.

The telephony request may include a recipient identifier and additional data.

The additional data may includes a code, the method including communicating with the recipient in conformance with the code.

The asynchronous communication may be a message.

The message may include a link, which may reference content for delivery to the recipient or the sender.

The method may further comprise determining a type of recipient and using the type when initiating the asynchronous communication, including communicating differentially between at least two recipients based on the type.

The method may further comprise receiving personalization information from the sender, and using the personalization information in the asynchronous communication with the recipient.

The step of using the personalization information may include using the personalization information to determine how to communicate with the recipient.

For example, using the personalization information may include using the personalization information to determine what message content to communicate to the recipient.

Disconnecting the call may include disconnecting the call at the sender without interaction by a user.

The call may be initiated and disconnected automatically in response to operation of a single control on a device of the sender.

For example, the single control may be color-coded orange.

Disconnecting the call may include disconnecting the call prior to the telephony network terminating the call.

Further aspects of the invention are summarised below

According to another aspect of the invention, there is provided a method comprising voiding a mobile originating telephony connection request to signal and invoke asynchronous supplementary services. The method involves: addressing the connection, signaling CONNECT and then signaling DISCONNECT thereby intentionally raising and dropping the connection at the onset, prior to connection completion; invoking a network managed supplementary service on the source and destination addresses thus captured, in response to the connection being voided.

Voiding the connection can occur at any time during the call "originating phase", that is after the request has been transmitted and before the network terminating the connection and/or ringing the destination Preferably, the connection request is voided at the earliest possible moment after signaling connect, and as such prior to commencing conventional switching and routing that results in connection completion Instantly voiding the connection thus, prior to the switch analyzing and processing the request, establishes an unstructured supplementary services protocol, in that the voided connection request can escape and bypass all legacy and conventional billing and switching logic The switch is thus engaged as a "conduit" which simply and transparently forwards all such voided requests to a service control point for further processing, without constraint and without limitation and typically without billing the originator In escaping analysis thus, the voided connection may be addressed as a standard phone number, describing a mobile (PLMN) and a fixed (PSTN) device, and any non standard number, variable in length and in format, that may include non numeric digits entered manually and/or programmatically The destination address may describe a mobile device, the said address being entered either manually, using the standard telephone keypad or automatically, when selected from a previously stored entry in the device phonebook or from the standard "missed, dialed and received" call manager logs, and the said voiding and resultant supplementary service thus being invoked without requiring any additional data input The said destination address may be "non standard" in format, the address encapsulating both the destination and additional logic codes, that are interpreted by the control point servicing the voided request, rather than by the switch, which now simply forwards the said voided request The non standard address may be programmatically generated by an embedded process, where the resultant number is binary encoded rather than human readable in format, and the said resultant number then passing through the switch and appropriately interpreted by the said service control point The said destination address may thus encapsulate additional signaling information and codes, particularly when the said supplementary service is invoked from an onscreen menu, where this additional information is then automatically applied to a regular subscriber telephone number, in a transient fashion The said supplementary service is thus triggered in a single automated step, whereby software programmatically flashes the connection data by issuing the said connect and disconnect command sequence disclosed.

The supplementary service invoked in response to the said voiding technique may be differentiated on the destination address type, being mobile, fixed and variable, and further differentiated on any optional codes these addresses may encapsulate The said supplementary service invoked on a mobile address may be differentiated when the source and the destination are one and the same address, in order to deliver service personalization options.

The said supplementary service, invoked in response to voiding a regular mobile subscriber telephone number (MSISDN), may be an event pushed back to the originating device and/or forward to the destination device The said event, may be a message delivered to the source and/or destination device via well known bearers, including SMS, MMS, WAP, USSD and GPRS, in what is well understood as "mobile terminated" delivery.

The said message sent to the source and/or destination device may contain embedded links (URLs), that connect the device to internet hosted servers, delivering seamless and instant access to content and thereby stimulating mobile originated data consumption The said embedded links may map the mobile source and destination addresses into internet addresses referencing highly personalized content, well known to the industry as BLOGS, these said personal references then being exchanged between the source and destination devices when delivering the said event.

The said supplementary service invoked in response to voiding may translate the said destination address into an associated Internet Protocol (IP) address, using well understood principles described by ENUM (RFC 2916) which details a method for translating a telephone number thus.

The said address translation thus permits the voided connection request data to be transported over the Internet, via well understood HTTP/S protocols, in a proxy initiated session that invokes a remote script, securely passing the source address and any additional data captured in the voided connection, as parameters.

The said Internet script may support mass automated telemetry and telemedicine applications, enabling seamless wireless data collection and control utilizing the most basic telephone equipment, as the data is now simply "dial streamed" in the most resource efficient manner possible, using the said voiding technique.

The connect and disconnect signaling functionality may be encapsulated in a new service button, implemented either in hardware, software and/or firmware and appropriately labeled ("ping") and/or colored ("orange") to effect the same result.

The said signaling functionality may, alternatively, be delivered by modifying an existing key, preferably the SEND key, through software, so that pressing the said key twice as in "double tapping", alternatively pressing and holding the said key, then activates the flash method disclosed.

The said signaling method may activate newly embedded device timers on detecting the "send" and "end" command sequence, in order to programmatically complete the said voiding technique in an optimal manner with respect to event timing and user notification.

The said precision timing may then permit users to signal "send" and "end" with no latency, immediately voiding the connection request at the source, prior to transmitting the said request to the network, and in thus short circuiting the process, enabling the device to signal the request asynchronously to the network, optionally using an alternate bearer, such as SMS.

BRIEF DESCRIPTION OF THE DRAWINGS

FIG. 1 is a high level schematic architectural diagram of a mobile telephony network on which the present invention can be implemented;

FIG. 2 is a diagram illustrating call setup procedures according to the prior art;

FIG. 3 is a diagram illustrating an embodiment of a method according to the present invention;

FIG. 4 is a diagram illustrating an example of a user customised embodiment of the method of FIG. 3;

FIG. 5 is a diagram illustrating message flow related to the method of FIG. 3; and FIG. 6 is a diagram illustrating an alternative embodiment of the method of the invention.

DESCRIPTION OF EMBODIMENTS

In mobile telephony systems, pressing SEND and END (connect and disconnect) one after the other on a user device is a signaling method that has up to now indicated a user's desire to abort a connection request.

Given that the addressing information has already been transmitted from the originating device towards the serving switch, almost instantaneously on pressing SEND, and that the disconnect command subsequently issued arrives in sequence, this presents an opportunity to capture and recycle the aborted event at the switch in order to deliver seamless offline supplementary services between the source and destination information thus presented.

In fixed line telephony networks, the equivalent to pressing SEND and END would be lifting and then replacing the receiver "off and on hook", which is a well understood phenomenon known as "tapping the receiver" and "flashing". This action on fixed line telephones signals the home office switch to invoke a supplementary service, typically toggling between an active call and a call waiting, alternatively presenting an additional dial tone permitting the user to place a second call while another call is active, without having to disconnect the first call.

The functional difference between dialing on fixed versus cellular systems is the reversed order in which addressing information is presented and transmitted. In fixed networks the user first lifts the receiver "off hook" and then proceeds to enter the destination address using DTMF signals, once a dial tone has been presented. In cellular telephony systems, the user first dials the destination address and then "lifts the receiver off hook" by pressing SEND, at which time the specified address is automatically signaled using control channel messaging. Thus, on cellular telephones one cannot "flash the switch", so to speak, without having already presented a connection request, in its entirety, to begin with.

The objective is to now leverage this cellular ability to flash a connection request to the switch, complete with source and destination address. Voiding the connection, using the SEND and END method disclosed, now invokes an offline supplementary service applied to the source and destination address, prior to the switch servicing the connection and in particular, prior to ringing the destination. The supplementary service is delivered by having the switch forward the disconnected event, which encapsulates the said addressing information, to a service node for further processing, rather than merely discarding the data which is the currently the case.

Networks vigorously monitor and log all "dropped call" events, and this has become an industry metric for quality assurance (the less dropped calls the better). These now intentionally dropped calls, are thus easily captured and rerouted, permitting the switch to immediately offload this new method handing over the connection request to an external node for offline processing.

Voiding connections to invoke supplementary service thus delivers the definitive "disconnected protocol". The service scales dramatically, as it permits users and devices to "hop on and off" the network, in the shortest possible timeframe, requesting asynchronous service delivery in an optimum and resource efficient manner, as no voice resources are allocated and/or consumed, and the entire transaction and service is kept within the signaling domain.

The exemplary service invoked on voiding is "pinging" of the destination and notifying the source, and exchanging personal links in the process. Pinging is the ability to initiate contact without establishing an "end to end session", as is required with voice telephony and ringing.

Note: in this the terms "connect" and "disconnect" are essentially interchangeable with "send" and "end" and similarly with "green" and "red" (corresponding to the standard colors on the "send" and "end" buttons on mobile telephones and similar devices). The terms "source" and "destination" are interchangeable with "A" and "B" and "caller" and "called". The bearers SMS and MMS and WAP may be interchangeable. Open terms and other bearers are possible.

In terms of the current state of the art in cellular telephony, signaling SEND and END is interpreted as a request to abort a connection, and in response to this user abort, the switch simply discards the connection data. When this voiding occurs during the onset, in a very specific window in time that exists between the switch receiving the connection request and the switch initiating conventional switching and routing ("the originating phase") this exception may however be used to signal a supplementary service.

One inventive step in the method disclosed herein now sees the switch recycling all such intentionally aborted connections received during this originating phase, rather than merely discarding them, as it currently does. Preferably the said abort is signaled at the earliest possible moment after signaling connect, prior to the switch performing credit verification and/or user validation, and prior to the switch analyzing and processing the connection request, alternatively prior to the switch reporting an error in the connection request.

This immediate voiding establishes an unstructured supplementary services protocol, as it escapes and bypasses legacy and conventional billing, switching and routing logic at the earliest possible moment. In "escaping" the switch thus, the flash method disclosed engages the switch as a "conduit" to transparently reroute all said aborted connection requests to a service control point for further asynchronous processing, whenever this aborted condition presents. Prior to this disclosed method, unstructured supplementary services have required encapsulation using escape codes, such as those required in USSD signaling. Being reliant on complex and manually entered codes, the user engagement of USSD services has been anything but seamless and consequently remains niche.

The quantum shift in this rudimentary signaling method disclosed is that the intentional abort is now interpreted as the escape sequence that seamlessly invokes supplementary service on regular dialed addresses. Further, as the method escapes the switch, it permits any addressing information, including numbers of any length and any format, to transparently pass through the cellular network to a serving node, suitably programmed to accept these aborted connection packets. The voided connection contains sufficient information, namely the source (A) and destination (B) addresses, to effect new and offline service.

Significantly, and in an exemplary embodiment, the said new method delivers new service directly and instantaneously to any mobile, when the said voiding technique is applied to a standard subscriber directory phone number (MSISDN) and phonebook entry, and the said new service is invoked directly on the source and the destination without any modification to the stored number required whatsoever. This connect and disconnect sequence is the differentiator that thus permits the caller to invoke and trigger supplementary services without requiring any additional codes and/or service selection options.

Describing the method in greater detail, and with reference to FIG. 1, a Mobile Station (MS10) is connected to an associated Base Station Subsystem (BSS) that is in turn connected to an originating Mobile Switching Center (MSC). A Service Control Point (SCP) of the network can be a globally addressable node accessed via Signaling System #7 (SS7), and as such may be common to all networks supporting the disclosed method.

Typically the routing path (50) between the source MSC and the said SCP is "least cost routed" over the Internet, using industry standard protocol conversions well known to those skilled in the art as "SIGTRAN" and "Openss7". These protocol converters seamlessly and securely transport encapsulated ss7 traffic over the public networks.

The caller MS (10) dials the address of the destination MS (20) and presses SEND. The dialed digits (B) are transmitted over the air interface portion (30) towards the serving MSC. Once the source handset indicates that the connection is being requested, typically displaying "Calling B . . . ", the caller then immediately presses END commanding the said MSC to "disconnect" (40) and thereby abort the request. The source or caller MS is now disconnected from the network.

The originating MSC then forwards the voided connection request header, including the source and destination (AB) address information, by routing the SS7 packet (50) towards the SCP serving the voided request. The SCP extracts the said addressing information and assembles a message (60), sent to the originating mobile via the source MSC, alerting the source that the service has been invoked. Similarly the SCP assembles a corresponding message (70) that delivers the supplementary service to the destination mobile (20) via the destination MSC.

The said data message (60) directed towards the source MS (10), can be addressed as one originating from MS (20) and the corresponding data message (70) sent in the opposite direction towards the destination MS (20) is similarly addressed as originating from MS (10). The two said data messages are thus addressed as "BA" and "AB" respectively. This addressing schema permits the source and destination to continue a seamlessly addressed dialog.

Typically, this message exchange results in the destination MS calling and establishing a conventional voice telephony connection (80) with the source. As the said telephony connection has now been physically reestablished in the reverse direction, the billing records associated with the resultant voice call is seamlessly transposed from "AB:BA". This permits the destination to pay for connecting the source, as the supplementary service and message exchange is delivered free of charge to the consumer.

It is important to note that this entire transaction between the source and destination is kept wholly within the signaling domain. Although the service is invoked on a voice telephony request, no voice resources are allocated and consumed. Since the supplementary service is a "disconnected protocol", the return voice connection, when established, seamlessly achieves billing reversal without requiring any modification to existing billing systems. The service is thus implicitly "interoperable".

Further, as the entire service is encapsulated a single "SS7 connection packet" (some 200 bytes) containing the source and destination address, this "all signaling service" can be enabled and hosted centrally and globally on a service node that is external to the carrier. This permits any carrier to deliver the said services simply on redirecting and forwarding the voided connection packets towards this global service node. This provides an outsourced and managed service requiring zero infrastructure investment for the participating carrier.

Continuing with FIG. 1, the data messages thus exchanged have embedded URL links that permit the source and the destination to originate data connections to the associated internet services (90) without having to key any additional addressing information. These links automatically invoke mobile originated data sessions using standard bearers such as WAP and GPRS. While these service capabilities are now pervasive, mobile data, up to now, has been over hyped and under utilized.

Given that the said supplementary service is enabled without any modification to handsets and invoked without any change in dial behavior, the ability to thus "seamlessly and en masse, present single click data functionality", giving instant access to remote internet services, describes a definitive "open walled garden" and tipping point for cellular data.

Two services are described in greater detail to illustrate the extent and scope of method disclosed and how it is applied to mobile and internet devices.

(1) Pinging Cells

Today, hundreds of millions of cellular users are "beeping" to communicate with one another by dialing and disconnecting once the destination phone rings, and in doing so, generating a "missed call event" to signal the other party at no cost to themselves. In a related and equally destructive behavioral problem, callers attempting to establish free contact in the said manner, are "slamming" (hanging up) when the destination phone is offline and unavailable (typically without leaving voicemail, as this would consume minutes and incur billing) and when having failed to reach the other party, these users repeat this behavior at increasing frequency, until contact is successfully established.

This behavior is especially prevalent amongst lower income prepaid users who now account for the majority, and the behavior increases in frequency as the prepaid balance approaches zero, as cells are not permitted to complete connections on insufficient credit.

The ability to "ping rather than ring a destination" has a fundamental bearing on the cellular industry, as the current beeping and slamming behavior are in themselves merely symptomatic of a much deeper underlying deficiency in telecommunication, related to a legacy binary signaling system. Telephony requests have since inception been limited to signaling only two possible states: "connect" and "disconnect", engaged by lifting the receiver off/on hook, binary one and zero, respectively. Modern digital cellular networks inherited this legacy binary signaling system, accentuating these two states by color coding them "green" and "red" (connect and disconnect).

Universal signaling systems however, require at minimum three signaling states, color coded: "green", "orange" and "red" (go/shift/stop) and the exemplary embodiment of this principle is found in traffic signals where the three universal states are encapsulated and well understood by all. Traffic signals without "orange" would result in utter chaos on the road, as drivers would collide with each other at intersections, as there would be no signaling shift (in consciousness) indicated between "go" and "stop".

Similarly, the behavioral chaos evident in cellular communication systems today, exists precisely because there is no "orange signaling state", and prior to the method disclosed, users thus had no signaling method to shift the connection, being limited to "connect" and "disconnect ("go/stop"). Lacking the means to signal the network appropriately, users simply "honk their horns" and "slam on brakes", immediately after having accelerated on green, when red suddenly and unexpectedly presents (called party unavailable). The result is an incomprehensible 20 billion cellular "collisions" a month on networks around the world.

The solution to this global "bipolar signaling disorder" is simply this: "orange may be indicated by signaling green and then red" (the resultant combined color). The method disclosed thus seamlessly weaves a virtual third strand into the double signaling helix governing all telephony connection requests. This said flashing technique is the only method known to the applicant to universally signal the said third state on the existing signaling and addressing schemas, as binary yields just four permutations: 11 10 01 00. Clearly neither SEND nor END can be signaled twice to achieve the same result.

Of course, where networks fail to deliver solutions to problems, the ingenuity of customers always rises to meet the challenge. Beeping is an example of this principle: a service that evolved out of a mass "unknown and unmet need", being the desire to establish contact without incurring cost, and to then typically engage in conversation when the another party expectantly returns the call, reversing connection billing in the process.

In cellular telephony, service only becomes ubiquitous when it achieves what is known as "2 clicks functionality", that is, the transaction can be completed in just two keystrokes. Anything more becomes frustrating on a highly repetitive basis. The signaling challenge described was to find a method to deliver service differentiation on dialing the one and same phone number. Beeping, although rather crudely invoked, managed to differentiate voice telephony without introducing additional keystrokes. However while it ingeniously succeeded in delivering "2 clicks" user functionality (albeit with a rather significant pause in between), beeping failed dramatically on the network side of the equation.

Today, networks are being severely compromised by beeping and slamming, as these informal supplementary services both engage the "ring", consuming vast amounts of voice related network resources in the process. The ring was conceived to establish voice telephony connections rather than "end to end" signaling, as it has now morphed into being.

Presenting the "ring" reserves and consumes precious voice resources and circuits. While both beeping and slamming require voice resources, slamming is an order of magnitude more costly, as the connection goes to completion and voice circuits are then consumed, full duplex, in both directions.

With reference to FIG. 2, which illustrates a prior art method of initiating contact with a dialed destination, these circuits are consumed toward the source (50) from the originating switch, in order to play ring back tones alerting the caller that the destination is ringing, and to play announcements to the caller when the destination is unavailable and/or diverted to voicemail.

Similarly, when the source and destination mobiles are serviced by different switches, and further still by different carriers, trunk circuits (20) are then reserved toward the destination (between the source and destination switches), to ensure that call completion is successful when the call is answered by the destination.

The basic call state model and setup process is well understood by those skilled in the art. Describing this process in a little more detail, when the caller (A) dials called party (B) and presses SEND, the originating MS (A) requests a connection via a setup request (10) sent towards the serving MSC. Once the source is authenticated, and billing has been verified, the MSC sends an "Initial Address Message" (IAM: 20) towards the destination MSC. The IAM contains all the necessary information required to complete a call connection, and reserves circuits as it progresses through the switching network.

On receiving the IAM, the destination MSC determines whether the destination is available and, if so, pages the mobile to inform it that an incoming call is being serviced. The MSC then sends the corresponding setup (30) which presents the caller identity (A) and then instructs the destination phone to ring. Once the destination has been successfully alerted, the destination MSC sends an "Address Complete Message" (ACM: 40) back to the originating MSC, which then alerts the caller that the called party is ringing. This alert is known as the "ring back tone" (RBT). Playing the RBT currently requires an active voice traffic channel (50).

When a beeper hears the RBT, they immediately press END, which sends a release command (60) that tears down the voice connection, resulting in a "missed call" displayed on the destination mobile. The typical timing around these events is noted in the figure as "T seconds" (cumulative). On average END is signaled 7 seconds after pressing SEND given that that it takes some 6 seconds before the RBT presents.

With beeping and slamming, the user and the network are thus typically engaged for this duration. In comparison, and with reference to FIG. 3, which illustrates the method of the present invention, pinging only engages the user for "1 second", as END is now signaled almost immediately after SEND, and "alerting" is then delivered asynchronously in both directions.

Describing the ping method in more detail, when the caller (A) dials the called party (B) and presses SEND, the originating MS (A) requests a connection via a setup request (10) sent towards the serving MSC. Typically, within one second after pressing SEND the caller now signals END to disconnect (20). One second is sufficient to ensure that the mobile station (A) has transmitted the connection request (10) to the serving MSC.

The originating MSC is thus commanded to abort the connection request (30). The voided connection, containing the source and destination (AB) addresses, is then forwarded to the Service Control Point (SCP) for further offline processing. On receiving the said voided data, the SCP immediately assembles an SMS message addressed to the source, alerting the caller that the service has been invoked (40) and similarly the SCP assembles an SMS message addressed to the destination, delivering the ping event (50) to the called party.

As the source is known to be "online" and available to the network, having just connected and disconnected, the alert message delivery is assured. If the destination device is unavailable, the ping message is stored and forwarded by the SCP once it becomes available. It is important to note that the entire ping transaction, both in the forward and reverse direction, is kept within the signaling domain. No voice resources are required.

In an alternate embodiment, where the handset is suitably programmed to detect and service the said voiding technique in an optimal manner, the user may instantaneously signal SEND and END, thus voiding the connection request at the source. With reference to FIG. 4, this optimized implementation engages the user only momentarily ("0 seconds"), as the device itself now sends the setup (10) and disconnect (11) events automatically and asynchronously.

This optimized ping invocation permits users to press SEND and END in rapid succession (using both thumbs) in a "rocking" motion, without having to visually gauge connection request establishment, and the device then simply displaying an appropriate message indicating "ping sent". With reference to FIG. 5, this optimized implementation permits precision timing around messages and channel allocation over the air interface portion. Further refinement to the said method would permit the user to simply "double tap" the SEND key to invoke the said method.

Typically, a conventional mobile originated telephony request requires traffic channels (TACH) to be allocated, and this method can ensure that the disconnect event is signaled prior to traffic channel allocation. The only channels required in this alternate voiding embodiment relate to servicing, authenticating and enciphering the telephony request (RACH: random access channel, AGCH: Grant Channel and SDCCH: standalone dedicated control channel).

While beeping and slamming incurs no cost to the consumer, the costs to networks are very real and very alarming Statistics that have recently come to light, from industry leaders such as Ericsson and Comverse, show that slamming alone accounts for some 30% of all calls made on the cellular network, and further that less than 60% of all cellular calls successfully go to completion.

To put this into perspective, a carrier with just 10 million users incurs over 100 million "slam downs" a month. Similarly, beeping has become such a phenomenon that 25% of callers now simply "ring and disconnect" as their primary means of communication. It is no surprise that the most critical issue facing the industry today is around improving "call completion"

Given that the collective global cellular community now totals some 2.1 billion users, the current magnitude of beeping and slamming, and their cumulative effects on spectrum and circuit utilization, can only be described as seismic. Furthermore, the next wave of cellular points to an additional 3 billion users, mostly in emerging markets with extremely limited disposable income, joining the cellular community by 2010.

The current trajectory sees the "ringing and disconnecting" behavior spiraling completely out of control, and with such mass market forces at play, every single second and every single resource on the network counts more than ever before. Network optimization around this phenomenon is going to become increasingly critical to ensure "just normal" service delivery.

The industry response to slamming has been the "Missed Call Alert" service. MCA notifies customers, typically via text messaging, of all call attempts made while they were offline and/or unavailable. While this service has shown incremental return call generation (5%) the service is still engaged "after the fact", as callers have already slammed the network as described.

The industry continues to tolerate beeping, as it similarly generates return call traffic. However the vexing nature of this problem is evident: networks cannot discern between "ringing to speak" and "ringing to beep" except, once again "after the fact" (the caller disconnected). The reality is, up to now, no viable alternative to beeping and slamming has existed, and mass consumer behavior can only be shifted on a superior offering.

The flashing method disclosed resolves this major industry challenge once and for all, simply by switching the process to one that is invoked "before rather than after the ring", and thus transforming the event to one that is signaled in the originating rather than terminating phase, permitting beepers to "hang up" immediately after dialing to effect the same result.

In fact "pinging" surpasses beeping as an "end to end" service in every respect. It not only delivers instant "2 clicks, done" functionality (users no longer have to wait for the ring as confirmation), it guarantees service delivery regardless of destination availability (as the ping is delivered via SMS with "store and forward" capability) and furthermore bars none from access (being freely provided, given network efficiencies realized).

Furthermore, this rudimentary signaling method and the service it delivers, is "virally self propagating" in that it "passes forward with instruction". As detailed in the example, the ping event informs the recipient how to invoke the service. Replicating in this manner permits the new service to seamlessly replace the old.

In uniquely operating before the ring, pinging ensures that virtually no network resources are consumed. Further and equally significant, the supplementary services delivered using this method open a valuable window for presenting links to personal and third party content. This "2 clicks access to data" can dramatically stimulate mobile originated data to the tipping point.

Describing the service in greater detail, on voiding the connection, in one implantation the caller immediately receives an SMS alerting that the service has been triggered. This notification can be automatically addressed as the called party number, validating that the ping was sent to the intended party, and this message delivered directly to the display (by a method known as "flash text"), rather than stored in the message inbox.

Conversely the destination receives a corresponding message, notifying the called party with caller number as source, so the message is displayed "by name" rather than by number when the source is stored in the recipient phonebook. The most basic ping service results in exchanging text messages between the source and destination as follows:
to source from destination: "u pinged me @12:03"
to destination from source: "i pinged u @12:03"

This simple service notifies and time stamps the event for the caller and the called and permits the two parties to negotiate a connection in the most efficient and unobtrusive manner possible. Pinging the destination thus delivers a seamless guaranteed method to initiate contact without ringing the destination, and therefore without consuming valuable network resources that were intended for voice communication.

Pinging is contextual with respect to both the time domain in which it is signaled and the social context within which it occurs, permitting the sender and receiver to define "the protocol". As such, pinging delivers a highly generic service that lends itself to individual interpretation. The ping context is unlimited:

Pinging to check in ("i am alive") . . . to gauge social connectedness ("are we tight") . . . to send a wink ("hi there") . . . to call to action ("where are u") . . . to rendezvous ("call me") . . . to establish presence ("i am available") . . . to notify ("on my way") . . .

The ping "response time", being the time it takes for the recipient to respond, is a measure of social connectedness and "priority". Service escalation, whereby the message text and tone naturally evolves in response to successive pings that go unanswered, delivers seamless service differentiation. This service escalation attenuates pinging frequency, as the protocol saturates, for example, in just four successive events.

For example, when source pings destination repeatedly without response, the following escalation can universally capture this unidirectional dialog:
(0) "i pinged u @12:03"
(1) "call me."
(2) "where ru?"
(3) "i need 2talk 2u!"

Pinging is a definitive "peer to peer" service, founded on a simple and engaging user experience. The embedded time stamp delivers assurance to both parties that the event transpired. The service is also extremely viral, in that it may be propagated "forward" simply by including "how2ping" in the recipient message. The result is exponential service propagation ($2^n$) without any formal marketing required:
"ps: dial send and end 2p!ng"

Further, as the ping message content is managed, consuming only a minor portion of the message payload, the ping service can tag additional content along for the ride. In the exemplary embodiment, a link (URL) to personal content (BLOGS) may be exchanged in the process. This presents an extremely compelling social networking opportunity, the digital equivalent to exchanging 3 dimensional contact cards.

To enable this functionality, the mobile owner is simply prompted, in the body of the ping message, to personalize the service:
"p!ng self 2personalize"

Initially, this results in a self addressed message instructing the owner how to personalize the ping service. This service message may be delivered as conventional text (SMS), where the information is then requested in free format reply. Alternatively, or in addition, the message may present a link (URL) that then opens an associated web form to capture owner preferences and information. Once personalized, pinging oneself can give instant access to personal content and additional service, such as BLOG page ranking and popularity.

These "enhanced ping events" are typically delivered using WAP push methods, and in particular via "service indicator" and "service loading" functionality, both well understood by those skilled in the art WAP permits "active content", including named links that then deliver simple click through action to retrieve and display associated content. It is also feasible, however, to deliver the URL in "plain text view", as nearly all handsets can identify such links embedded in plain SMS text messages. The latter method makes no assumptions as to extended handset capability (WAP and data availability) as capability then automatically ascertained on successfully clicking the text link.

The ability to thus tag and embed a link opens a "ping portal", where further links then serve to expand the "view". The following text message, delivered back to the source on pinging self, illustrates the process:
to: "+14154125111" (self addressed)
from: "+14154125111"
text: "personalize your ping: reply with name and homepage (blog) URL. www.pingpong.com/?session= . . . ,"

As the source and destination address of this message is "one and the same", the switch can be instructed to forward (and/or copy) all replies to the ping service control point, without compromising regular SMS delivery and functionality. The service control point captures and stores the said relationship between mobile phone number, name, URL and other information, for inclusion in future pings.

This information may be recorded in privately hosted NAPTR Resource Records, according to the ENUM protocol. This seamless "all mobile solution" permits users to securely self administer the service, as only the owner mobile can set owner information and thereby populate the associated resource records. Up to now, securely populating ENUM resource records has been problematic, requiring administrative support.

The more information a user elects to disclose, the more personal and the "richer the ping experience" becomes. For example, returning a WAP link that references a "narrowband" BLOG service (adapted to mobile phones) in response to pinging self, delivers a compelling all-mobile solution that permits users to journal on the move and then instantly ping friends to read news "hot off the press".

As the source and destination mobiles (A and B) are captured in the ping event, highly customized BLOG views may be presented, simply on tagging content with associated phone numbers. This level of service granularity permits, for example, kids to seamlessly ping parents, without intimate disclosure, while pinging friends to automatically swap journals in detail.

This "peer to peer" information exchange, delivers a highly personal mobile channel. For example, voiding a connection request between mobile A (+14154125111) and mobile B (+14154125000) where A dials "B SEND and END", and where both have previously personalized the service as described, results in the following two WAP messages exchanged:
(A) back to source:
to: +14154125111
from: +14154125000
text: u p!nged me @12:03
>about B (google mobile)

The "google" (trade mark) reference shows how a leading new media company can be hooked into the ping portal at the topmost level, and serves to illustrate the priceless "real estate" that this opportunity presents.
(B) forward to destination:
to: +14154125000
from: +14154125111
text: i p!nged u @12:03
ari kahn
>about A (google mobile)

Pinging thus further opens a "direct to consumer" marketing channel that has none of the pitfalls typically associated with "unsolicited campaigns", as third parties now get to be perceived and valued as "service sponsors". The "ping portal" can host paid for advertising tags, including URL, phone numbers and text clips. These secondary links provide unlimited access to remote service options.

For example, a link that points to dynamically generated 2D bar codes, encapsulating the caller identity and a featured product code, delivers a seamless and virtual coupon distribution mechanism, which can be presented and scanned at point of sale. Pinging thus rapidly evolves into a definitive wireless "pay per view/click/call" advertising model with:
i) guaranteed message visibility
ii) authenticated return call and click paths It is evident that the scope and magnitude of this archetypal service has the potential to eclipse even the most successful internet "search based" advertising models, as the audience here is some 2 billion people, who can be instantly enabled with the said service without requiring any modifications to existing handsets, and where the benefits to carriers and customers and advertisers are second to none.

Pinging is the exemplary service delivered in response to voiding connections on regular dialed mobile subscriber directory numbers (MSISDN). It delivers a much needed "presence protocol", whereby the caller voids the connection initiate contact, to indicate to the called party that they are present . . . that they are available to talk . . . that they have updated publications online . . . and so on.

Further, this service translates into the highest degrees of call completion possible, as users now get to handshake and setup a connection "rendezvous", all without invoking the ring and thus without consuming any voice circuits in the process. The solution to servicing emerging mass markets effectively and profitably, as well as resolving the current behavioral problems in existing markets, is none other than simply delivering this said, and up to now omitted, third signaling state: "orange".

Pinging is the most primitive event common to all communications systems, and the disclosed method now enables cells to "signal" one another unobtrusively, without invoking the ring. At the higher end of the cellular market, where people are time strapped, pinging is the most effective means to establish "presence", requesting a return call from the recipient when they have time available to talk, whereas in the lower end of the market, where users are cash strapped, pinging permits the sender to request the recipient to call back and thus pay for the connection:
"A pings B rings A"

In its most reduced form, this simple yet profound service, being a disconnected protocol delivers seamless billing reversal (AB:BA) without requiring any modifications to legacy billing systems. As illustrated above pinging literally "reverses revenue streams and inverts social pyramids", permitting those who have, to pay for those who have not.

(2) Pinging Servers

The ability to flash data using the said voiding technique opens limitless data possibilities, particularly when the said method is embedded in software applications and when the pinged device is fixed rather than mobile. When pinging is invoked under software, rather than user control, precise event timing and message sequencing, as illustrated in FIG. 5, ensures that connection information submitted on voiding can escape conventional switching analysis and transparently reroute to the serving control point.

Pinging in this manner delivers telemetry applications at a low price point using the most basic mobile phone circuitry, as data is now simply "dial streamed" on a regular telephony connection request rather than transported using handsets that require advanced data capability and costly bearers. Flashing data thus delivers viable mass automated telemetry and telemedicine applications, as the data is transported in a resource efficient manner, and seamlessly and securely routed to an associated Internet address.

Conventional telephony addressing utilizes just 5% of the theoretical dial domain, as the ETSI e.164 standard, stipulates that the maximum dialed digits permissible, from a business process and billing standpoint, is 15 digits. While fifteen digits can uniquely describe several hundred billion unique phone numbers (geographically mapped), these "human readable" addresses represent only a small portion of the true number space. Dialed digits are transported using BCD (binary coded decimal), where each digit is encoded in hexadecimal notation, which itself describes a 16 digit number space: 4 bits (01234567890ABCDEF).

BCD and the universal telephone matrix both have precisely 16 unique digit: the decimal digits "01234567890", the star(*) and pound(#) keys and the lesser known "ABCD" signals, typically used for application control. BDC is however, only a "presentation layer", and in no way restricts the type of binary encoded data that can be transported in the dialed address. As the dialed address may be variable, and the data transported in multiple control packets, the setup protocol requires the source to specify the address length.

This address length parameter permits one to specify an address that is "256 BCD digits", describing a number space "128 bytes" in length. To put this in context, whereas a "googol" is a mathematical term describing a number space that is "1×10^100" (one followed by one hundred zeros), the dial space can describe a domain that is 1×10^300, that is three hundred orders of magnitude greater. The following simple grammar thus permits one to dial stream 128 bytes of data using an unstructured "protocol", where star separates dialed address and payload:

"address*payload SEND and END"

With reference to FIG. 1, telemetry services (100) are enabled by translating the dialed address portion thus captured in the voided request, into a URL that in turn, is resolved into an IP address using standard Domain Name Server (DNS) query and response. The data is then transported using standard HTTPS (secure) protocol. Assuming that the sending mobile phone number is "14154125111" (in normalized e.164 international notation), the destination number is "12345", and that this short dial code has been assigned to the "starscribernet" domain, the following submission results: "HTTPS://5.4.3.2.1.starscriber.net"/?A=14154125111 &payload= . . . "

This results in an "end to end" encrypted transaction. The flash method disclosed thus enables an invoking terminal to dial stream and burst data over the initial connection request, transporting additional signaling data in an "unstructured" fashion. This data protocol, interpreted by the serving node rather than the switch, is capable of supporting an infinite variety of new services, provisioned once on enabling the void service and method disclosed.

With reference to FIG. 6, which illustrates an alternate method for transporting "ping connection requests" on suitably programmed phones, the request voided immediately thus at the device level, assembles an SMS text message (1), addressed to the source. The body of the said message now encapsulates the destination address and any additional data relating to the said event.

As described earlier, these "self addressed" messages may be freely rerouted without compromising conventional text message processing. On receiving the said self addressed mobile originated text message, the serving MSC then immediately forwards the SMS to the control point servicing the ping. The SCP extracts the data encapsulated in the message payload and completes the said ping method, as the first portion of data in the said message, is the destination address (for example "+14154125111").

This alternate embodiment and bearer for delivering the said supplementary services, permits equivalent functionality without having to generate dropped calls. It is envisaged that the ping methods described which require no modification to existing handsets, evolve thus into optimized methods embedded in updated and future handsets.

For example, a phone with embedded GPS capability can automatically pulse location updates to a predetermined address and/or the user can manually send the same by highlighting a contact in the phonebook and selecting a menu option titled "send my location", on suitably programmed phones. Both actions would result in the application flashing coordinate information (including latitude, longitude, velocity and bearing). A service code could then instruct the control point servicing the voided request what action to perform. Service codes encapsulated in the payload deliver programmable service differentiation.

Continuing with the example above, selecting the menu option would then transiently transform the mobile phone number (address) into the said data stream, encapsulating location information data. On flashing the data using the method described, the service node receiving the associated data and service code could then simply reverse encode the latitude and longitude mapping it a street address, and then forward an SMS description to the stipulated destination mobile with the sender's current location, all in a matter of seconds.

Applying the said technique to medical applications can permit remote wireless monitors to literally pulse heartbeats around the world in seconds, where the data seamlessly transports to the serving practitioners web site and desktop. Pulsing data using this method is the digital "burst equivalent" to the sequential and analog "Morse code", where data is flashed in discrete events and where timing indicates the delimiter.

In summary, the present invention provides a universal method and system for signaling asynchronous supplementary services. In one implementation, the method includes dialing a number, pressing SEND and then pressing END, thereby raising and dropping the telephony request at the onset, intentionally voiding the connection at the switch, which then forwards the voided request, including the source and destination addresses thus captured, to a network service control point for further offline processing. This intentional abort can be seen as the universally applicable exception that signals and delivers end to end supplementary services, in particular, on regular dialed mobile subscriber phone numbers.

The voiding technique works on any mobile phone, without modification, delivering ubiquitous "two clicks, done" service, without incurring any cost to the user and only marginal signaling cost to the network, as the method disclosed "disconnects before the ring". This rudimentary signaling method addresses and resolves an extremely costly and complex cellular behavioral phenomenon known to the industry as "beeping and slamming", where callers en masse, signal one another by "disconnecting after the ring", consuming valuable network resources intended for brokering voice connections in the process. Further, the method opens a unique window for serving highly personalized content, via links embedded and exchanged between the source and destination mobiles. These links dramatically increase mobile originating data consumption. The disclosed method is termed "flashing" and the service delivered is called "pinging".

The invention claimed is:

1. A method comprising:
receiving, at a service control point from a mobile switching center, an indication that:
a request to initiate a telephone call was received from a mobile telephone, the request comprising a source address and a destination address,
a request to terminate the telephone call was received from the mobile telephone before the mobile switching center associated with the source address initiated a process to establish a traffic channel with a destination mobile switching center associated with the destination address and prior to destination address traffic channel allocation,
the request to terminate the telephone call was received within a predetermined amount of time following the receipt of the request to initiate the telephone call, and
a voice telephony connection has not been established between the source address and the destination address;
responsive to receiving the indication, generating a supplementary service message at the service control point, wherein the supplementary service message comprises a request to initiate a telephone call from the destination address to the source address; and
transmitting the supplementary service message from the service control point to at least one of the source address and the destination address.

2. The method of claim 1 wherein each of the source address and the destination address is a telephone number.

3. The method of claim 1 wherein the supplementary service message comprises a link.

4. The method of claim 3 wherein the link references content for delivery to at least one of the source address or the destination address.

5. The method of claim 1 further comprising determining a device type associated with the destination addresses, wherein the generating of the supplementary service message comprises generating the supplementary service message based, at least in part, on the device type.

6. The method of claim 1 further comprising receiving personalization information from the mobile device, wherein the generating of the supplementary service message comprises generating the supplementary service message based, at least in part, on the personalization information.

7. The method of claim 6 further comprising determining content of the supplementary service message based on the personalization information.

8. A service control point configured to:
receive, from a mobile switching center, an indication that:
a request to initiate a telephone call was received from a mobile telephone, the request comprising a source address and a destination address,
a request to terminate the telephone call was received from the mobile telephone before the mobile switching center associated with the source address initiated a process to establish a traffic channel with a destination mobile switching center associated with the destination address and prior to destination address traffic channel allocation,
the request to terminate the telephone call was received within a predetermined amount of time following the receipt of the request to initiate the telephone call, and
the voice telephony connection between the source address and the destination address has not been established;
responsive to receiving the indication, generate a supplementary service message,
wherein the supplementary service message comprises a request to initiate a telephone call from the destination address to the source address; and
transmit the supplementary service message to at least one of the source address and the destination address.

9. The service control point of claim 8 wherein each of the source address and the destination address is a telephone number.

10. The service control point of claim 8 wherein the supplementary service message comprises a link.

11. The service control point of claim 10 wherein the link references content for delivery to at least one of the source address or the destination address.

12. The service control point of claim 8 wherein the service control point is further configured to determine a device type associated with the destination addresses, wherein the service control point is configured to generate the supplementary service message based, at least in part, on the device type.

13. The service control point of claim 8 wherein the service control point is further configured to receive personalization information from the mobile device, wherein the service control point is configured to generate the supplementary service message based, at least in part, on the personalization information.

14. The service control point of claim 13 wherein the service control point is further configured determine content of the supplementary service message based on the personalization information.

15. A non-transitory computer-readable medium comprising computer-executable instructions, which when executed by a processor, cause the processor to perform operations comprising:
receiving, from a mobile switching center, an indication that:
a request to initiate a telephone call was received from a mobile telephone, the request comprising a source address and a destination address,
a request to terminate the telephone call was received from the mobile telephone before the mobile switching center associated with the source address initiated a process to establish a traffic channel with a destination mobile switching center associated with the destination address and prior to destination address traffic channel allocation,
the request to terminate the telephone call was received within a predetermined amount of time following the receipt of the request to initiate the telephone call, and
the voice telephony connection between the source address and the destination address has not been established;
responsive to receiving the indication, generating a supplementary service message, wherein the supplementary service message comprises a request to initiate a telephone call from the destination address to the source address; and
transmitting the supplementary service message to at least one of the source address and the destination address.

16. The non-transitory computer-readable medium of claim 15 wherein each of the source address and the destination address is a telephone number.

17. The non-transitory computer-readable medium of claim 15 wherein the supplementary service message comprises a link.

18. The non-transitory computer-readable medium of claim 17 wherein the link references content for delivery to at least one of the source address or the destination address.

19. The non-transitory computer-readable medium of claim 15 wherein the operations further comprise determining a device type associated with the destination addresses, and wherein the operation of generating the supplementary service message comprises generating the supplementary service message based, at least in part, on the device type.

20. The non-transitory computer-readable medium of claim 15 wherein the operations further comprise receiving personalization information from the mobile device, and wherein the operation of generating the supplementary service message comprises generating the supplementary service message based, at least in part, on the personalization information.

21. The non-transitory computer-readable medium of claim 20 further comprising the operation of determining content of the supplementary service message based on the personalization information.

22. The non-transitory computer-readable medium of claim 15 wherein the indication further indicates that the request to initiate the telephone call and the request to terminate the telephone call were both initiated in response to the activation of a single control on the mobile device.

* * * * *